(12) United States Patent
Hall (10) Patent No.: US 7,909,366 B1
(45) Date of Patent: Mar. 22, 2011

(54) UNIVERSAL MOUNTING COUPLER FOR POOLS AND SWIM TREADMILLS

(76) Inventor: David E. Hall, Rock Island, IL (US)

( * ) Notice: Subject to any disclaimer, the term of this patent is extended or adjusted under 35 U.S.C. 154(b) by 353 days.

(21) Appl. No.: 12/189,787

(22) Filed: Aug. 12, 2008

Related U.S. Application Data (60) Provisional application No. 60/964,303, filed on Aug. 10, 2007.

(51) Int. Cl.
*F16L 41/14* (2006.01)
(52) U.S. Cl. .................. 285/205; 285/148.28; 285/206; 285/219; 4/507
(58) Field of Classification Search ............... 285/143.1, 285/148.28, 201–208, 219–220, 356, 357, 285/390, 392; 4/507
See application file for complete search history.

(56) References Cited

U.S. PATENT DOCUMENTS

| | | | | | |
|---|---|---|---|---|---|
| 1,861,842 | A | * | 6/1932 | Creighton | 137/356 |
| 1,863,360 | A | * | 6/1932 | Weatherhead, Jr. | 285/148.13 |
| 1,885,042 | A | * | 10/1932 | Baldwin, Jr. | 285/62 |
| 3,101,204 | A | * | 8/1963 | Pratley | 285/149.1 |
| 3,578,023 | A | * | 5/1971 | Diemond et al. | 137/592 |
| 3,749,424 | A | * | 7/1973 | Greene | 285/139.1 |
| 4,281,422 | A | * | 8/1981 | Simonelli | 4/496 |
| 5,253,374 | A | * | 10/1993 | Langill | 4/508 |
| 5,971,444 | A | * | 10/1999 | Hawkins | 285/206 |
| 6,676,168 | B2 | * | 1/2004 | McAliley | 285/206 |
| 6,883,836 | B2 | * | 4/2005 | Breay et al. | 285/189 |
| 2005/0077725 | A1 | * | 4/2005 | Bartholoma et al. | 285/143.1 |

* cited by examiner

*Primary Examiner* — James M Hewitt
(74) *Attorney, Agent, or Firm* — Hamilton IP Law, PC.; Jay R. Hamilton; Charles A. Damschen (57) ABSTRACT

A universal mounting coupling may be inserted into and through the support structure of a self-contained swimming pool to allow for use of a removable externally driven hydraulic propulsion system to produce a self-contained swimming pool for containment of water and generation of water currents therein for exercise, therapy and or rehabilitation of a user.

9 Claims, 13 Drawing Sheets

UNIVERSAL MOUNTING COUPLER FOR POOLS AND SWIM TREADMILLS

CROSS REFERENCE TO RELATED APPLICATIONS

The Applicant claims priority under 35 U.S.C. §119(e) of provisional U.S. Patent Application Ser. No. 60/964,303 filed on Aug. 10, 2007.

FIELD OF INVENTION

Swimming pools and more particularly, self-contained swimming pools that can generate currents of various speeds for exercise, therapy and rehabilitation. The present invention relates to an improved swim treadmill which may be deployed through a novel structure within any pool structure.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DETAILED DESCRIPTION—LISTING OF ELEMENTS

| ELEMENT DESCRIPTION | ELEMENT # |
| --- | --- |
| Pool Wall (Steel) | 1 |
| Latex Surface | 2 |
| Pool Wall Substructure | 3 |
| Coping | 4 |
| Pool Cover | 5 |
| Universal Mounting Coupling | 6 |
| Outer (Face) Ring | 7 |
| Screw(s) | 8 |
| Isolator | 9 |
| O-ring | 10 |
| Nipple (Poolside) | 11 |
| Nipple (Exterior) | 12 |
| Isolator Opening | 13 |
| Locking Nut Internal | 14 |
| Keyhole | 15 |
| Frame Handle | 16 |
| Hole (Pool Wall) | 17 |
| Wheels | 18 |
| Hydraulic Hose | 19 |
| Top Mounting Cover | 20 |
| Side Mounting Cover | 21 |
| Power Unit | 22 |
| Intentionally Blank | 23 |
| Intentionally Blank | 24 |
| Intentionally Blank | 25 |
| Filter & Pump Package | 26 |
| Filter | 27 |
| Locking Nut External | 28 |
| Drainage | 29 |
| Self-Contained Exercise Pool | 30 |
| Underwater Benches | 31 |
| Propulsion System | 32 |
| Propulsion System Housing | 33 |
| Propulsion System Back Plate | 34 |
| Intake | 35 |
| Discharge | 36 |
| Wheels | 37 |
| First Cap | 38 |
| Second Cap | 39 |
| First Portion | 40 |
| First Fitting | 41 |
| Internal Passage | 42 |
| First Bushing | 43 |
| Internal Passage | 44 |
| Second Portion | 45 |
| Barrel | 46 |
| Internal Passage | 47 |
| Exterior Portion of Barrel | 48 |
| Exterior Locking Portion | 49 |
| Internal Retainer Portion | 50 |
| Sealing Element | 51 |
| Outer Ring | 52 |
| Second Fitting | 53 |
| Internal Passage | 54 |
| Third Portion | 55 |
| Internal Passage | 56 |
| Second Bushing | 57 |
| Face (Exterior Locking Portion) | 58 |
| Non-curved side (barrel) | 59 |
| Radiused face | 60 |

DETAILED DESCRIPTION

Figure 1:
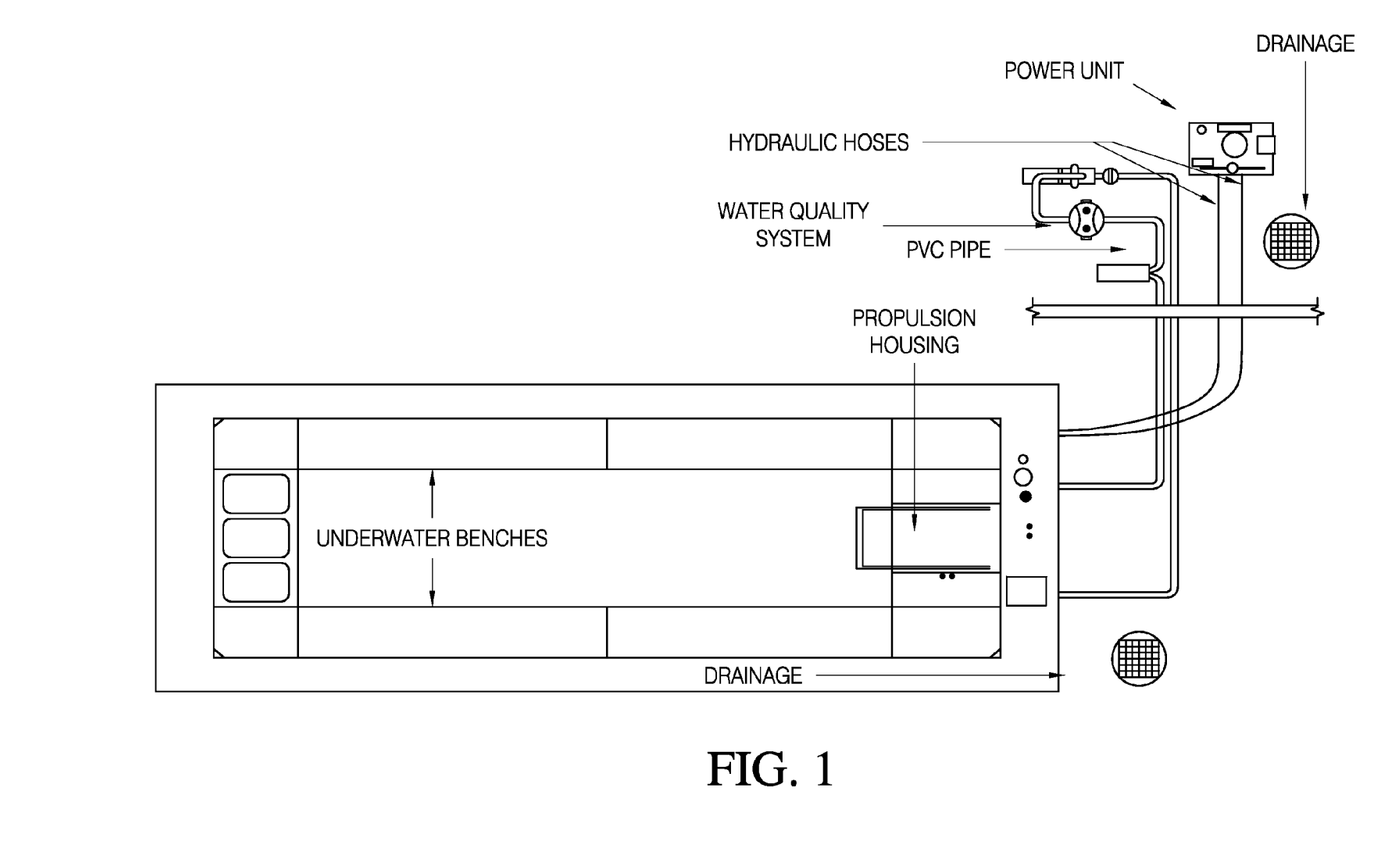
FIG. 1 is a simplified perspective view of the major components comprising a self-contained exercise pool to which the present art may be applied.
Figure 2:
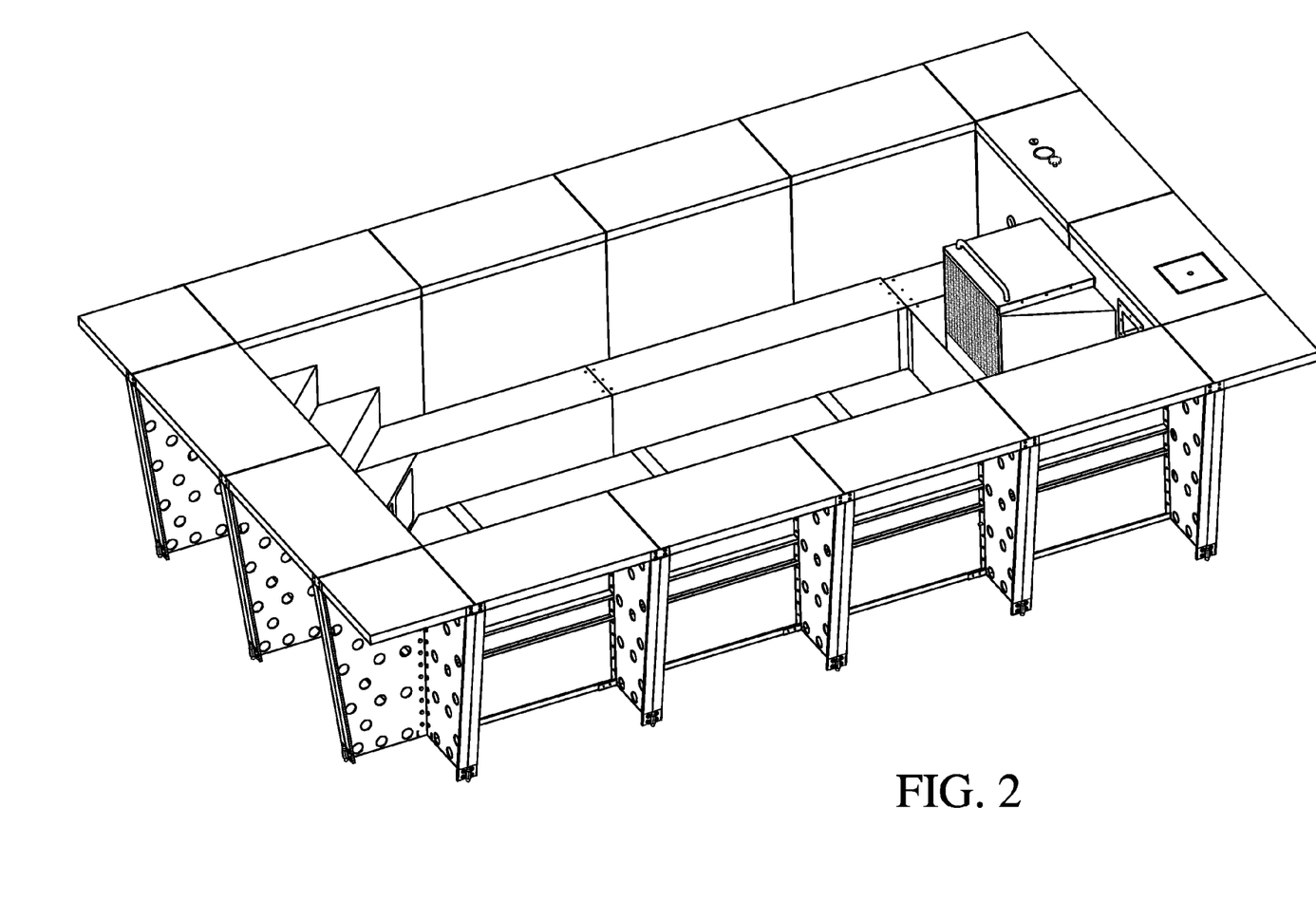
FIG. 2 illustrates a section of the self-contained exercise pool support structure.

Referring now to the drawings, wherein like reference numerals designate identical or corresponding parts throughout the several views, as illustrated in FIG. 1 which is a schematic of a self-contained exercise pool, may be implemented in a dedicated structure for a self-contained exercise pool and swim treadmill. U.S. Pat. No. 5,044,021 issued to Murdock is an example of a self-contained exercise pool and swim treadmill, which is incorporated by reference herein. A simplified perspective view of the major components of Applicant's improved version of the self-contained exercise pool is illustrated in FIG. 2. Applicant's unique structure, which Applicant has branded as the "Riverpool®" as illustrated in FIGS. 1 and 2 is currently the subject of U.S. Pat. No. 11,986,572 and is incorporated by reference herein. As shown, the pool is comprised of an externally positioned power system used to drive a hydraulic system which is connected by hydraulic hoses to drive a water propulsion system positioned within the four walls of the self-contained swimming pool.

Figure 3:
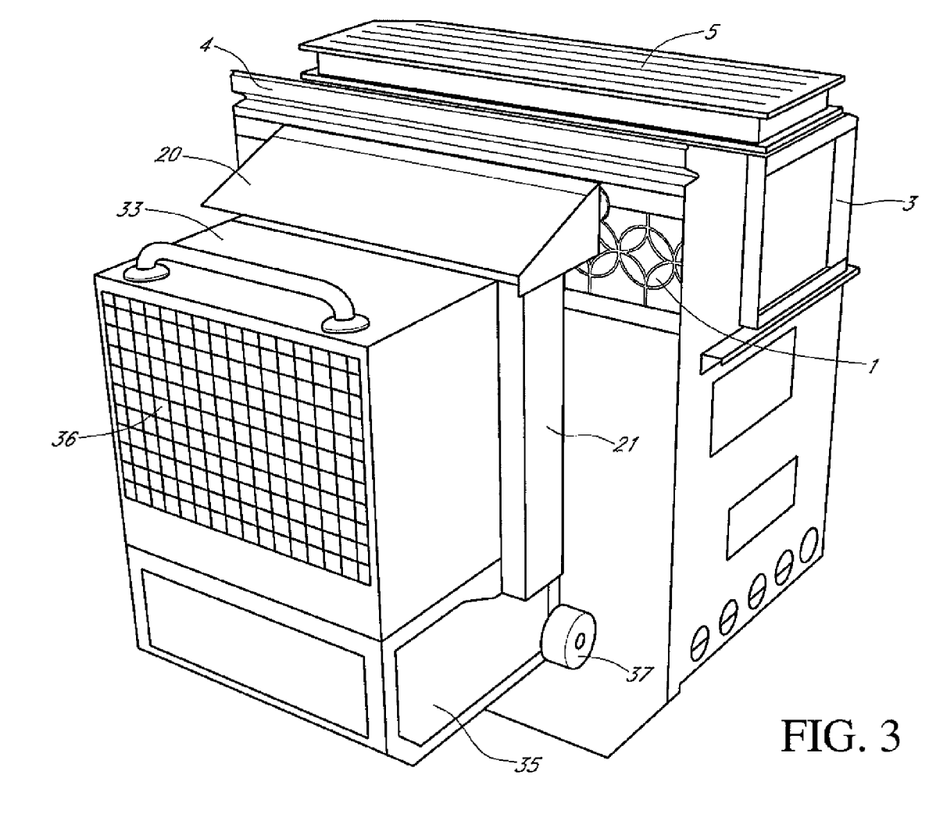
FIG. 3 illustrates a removable propulsion system mounted to a pool wall by a universal mounting coupling.

The propulsion system, as generally illustrated in FIG. 3, is to be mounted at a first end of the self-contained swimming pool for containment of water and generation of water current flows. The water current flows are delivered from the first end to the second end of the pool for exercise, therapy and or rehabilitation of a user. During operation, the user typically faces the propulsion unit. The self-contained exercise pool is sized so that during operation a user may swim or exercise against the current generated by the propulsion system. The inner water circulation and containment area is created by a rigid frame around the outer perimeter therein. (FIG. 2) A set of water return channels within intake ports at the second end of the pool allow the return of the water current flows back to the propulsion system. To maximize user functionality, a seating surface (underwater benches 31) has been placed upon the water return channels to allow for user seating on either side of the water current flows. (FIG. 2)

Although not shown, those of ordinary skill in the arts will appreciate that a hydraulic pumping system is typically exteriorly mounted. The hydraulic pumping system is typically self-contained. The hydraulic pumping system typically has an electrically driven pump to circulate some sort of hydraulic fluid through hydraulic hoses or piping connected to the propulsion system. Applicant's prefers a glycol based pumping solution as it is non-toxic to humans and animals. Although the system as designed minimizes the potential for glycol to enter the water of the pool, if the material does enter the water, it is easily separated from the water through the filtration system of the pool. (Not shown)

Currently, self-contained exercise pools and swim treadmills are experiencing growing popularity while the sales of traditional larger swimming pools are declining. In response to this change in conditions, Applicant has developed a universal mounting coupler 6 to allow the conversion of any self-contained pool structure to an exercise swim treadmill, as illustrated in FIGS. 3-9.

FIG. 3 illustrates a removable propulsion system 32 which may be mounted within any pool having an external support structure (2, 3) to which a universal mounting coupling 6 may be inserted. Typically, the support wall structure of a swimming pool is formed from steel, concrete or any rigid durable material known to those skilled in the arts. The pool wall 1 shown herein is formed of steel as is the pool wall substructure. The choice of steel for these elements in no way limits the scope of the disclosure. At least one universal mounting coupling 6 is then inserted into and through the pool wall 2 and the pool wall substructure 3. A removable propulsion system 32 may be positioned to hang from the universal mounting coupling 6. As shown, the removable propulsion system 32 is hydraulically driven. Using the universal mounting coupling 6 in pairs has been the preferred embodiment but is not limiting. An externally located power system may then be fluidly connected to the removable propulsion system 32 to provide "power" through a motive force. Because of the inherent danger of using electricity around a recreational pool, it is preferred to choose a non-toxic, substantially inert fluid to drive the propulsion system 32. The universal mounting coupling 6 as shown is positioned between and within the pool support walls (2, 3) and is substantially impermeable to water while supporting the removable propulsion system 32. The universal mounting coupling 6 allows connection and use of the propulsion system 32 with a hydraulic based power system without ingress of water into the universal mounting coupler 6 or egress of the hydraulic fluid from the hydraulic system or into the pool water. (Not shown)

Figure 4:
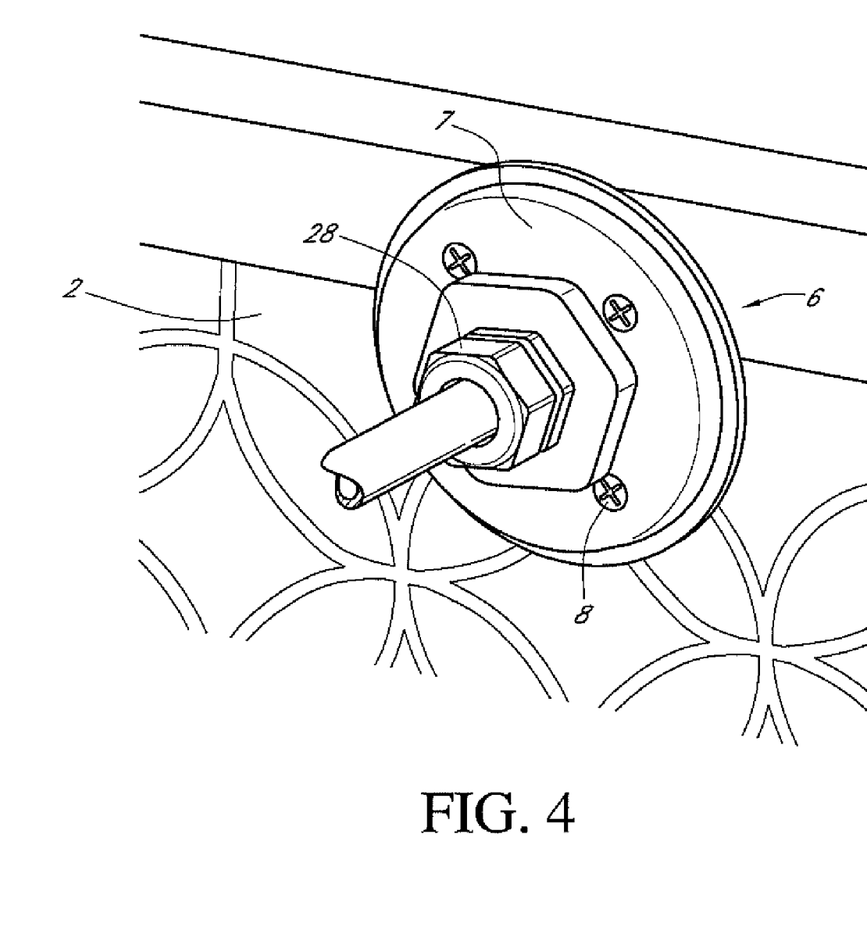
FIG. 4 illustrates a universal mounting coupling inserted through the pool wall structure.
Figure 4A:
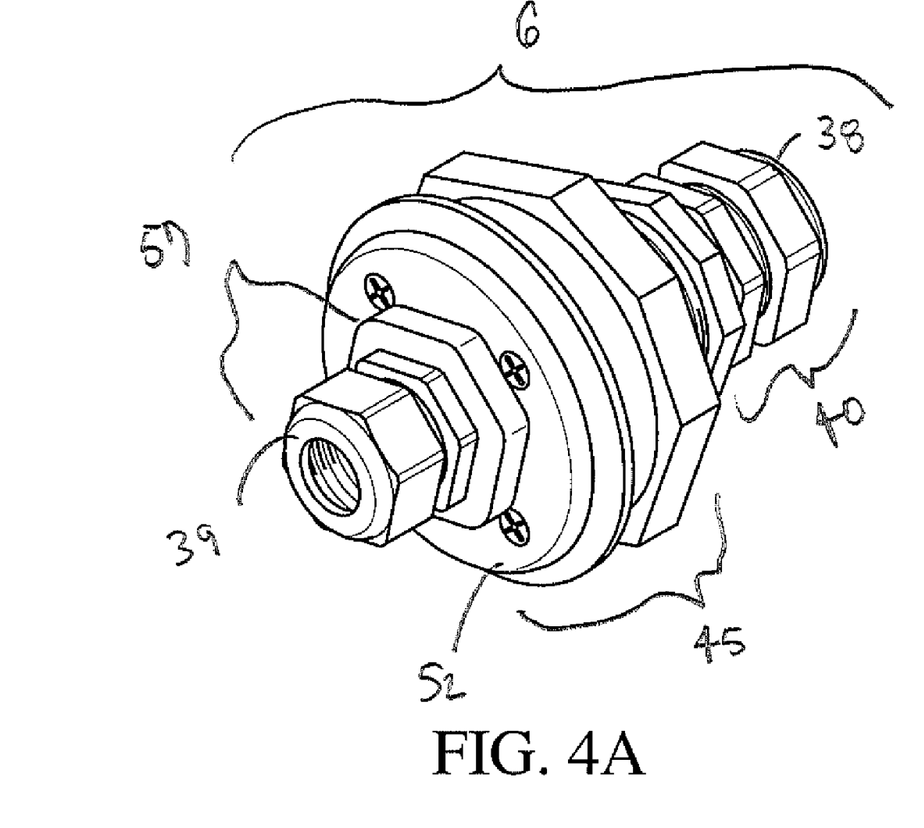
FIG. 4A provides a detailed view of the universal mounting coupler.
Figure 4B:
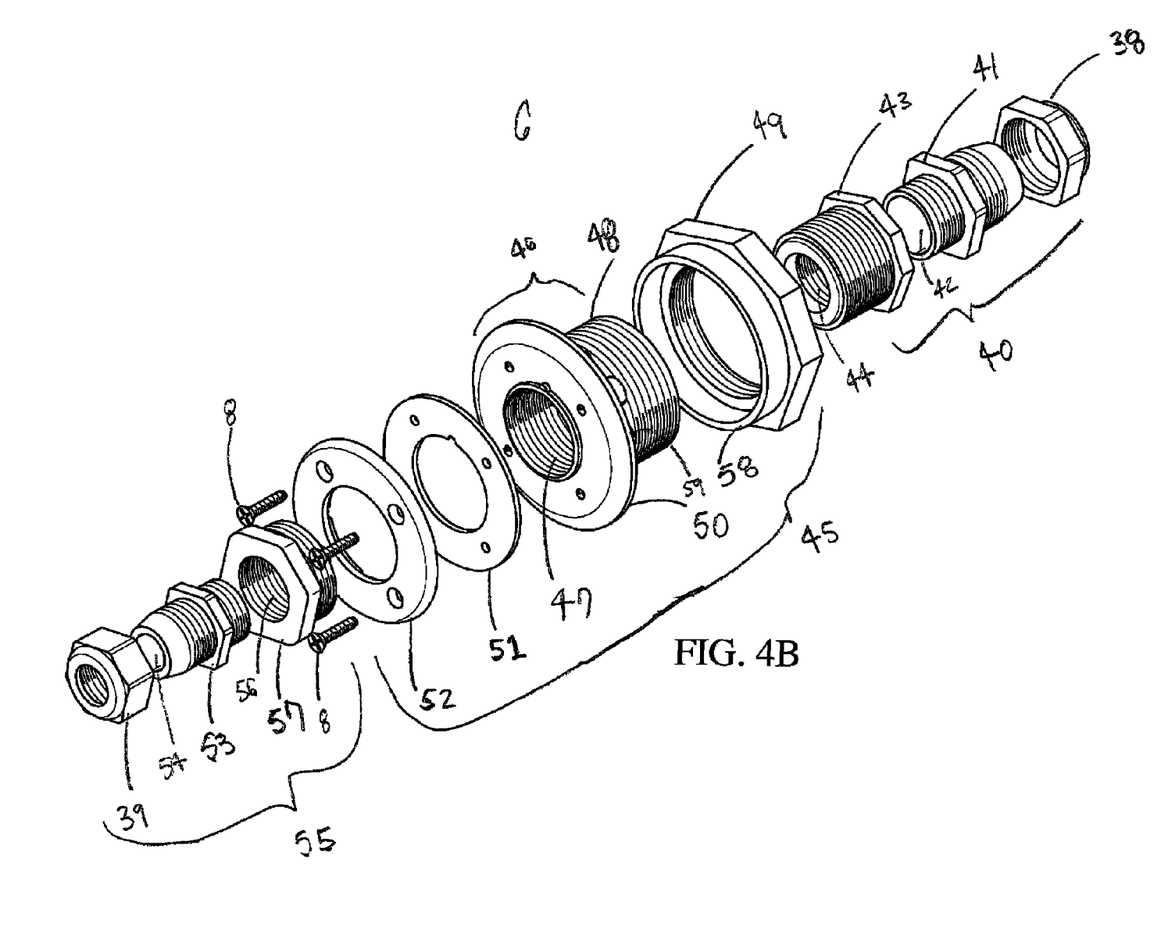
FIG. 4B provides an exploded view of the universal mounting coupler.
Figure 5A:
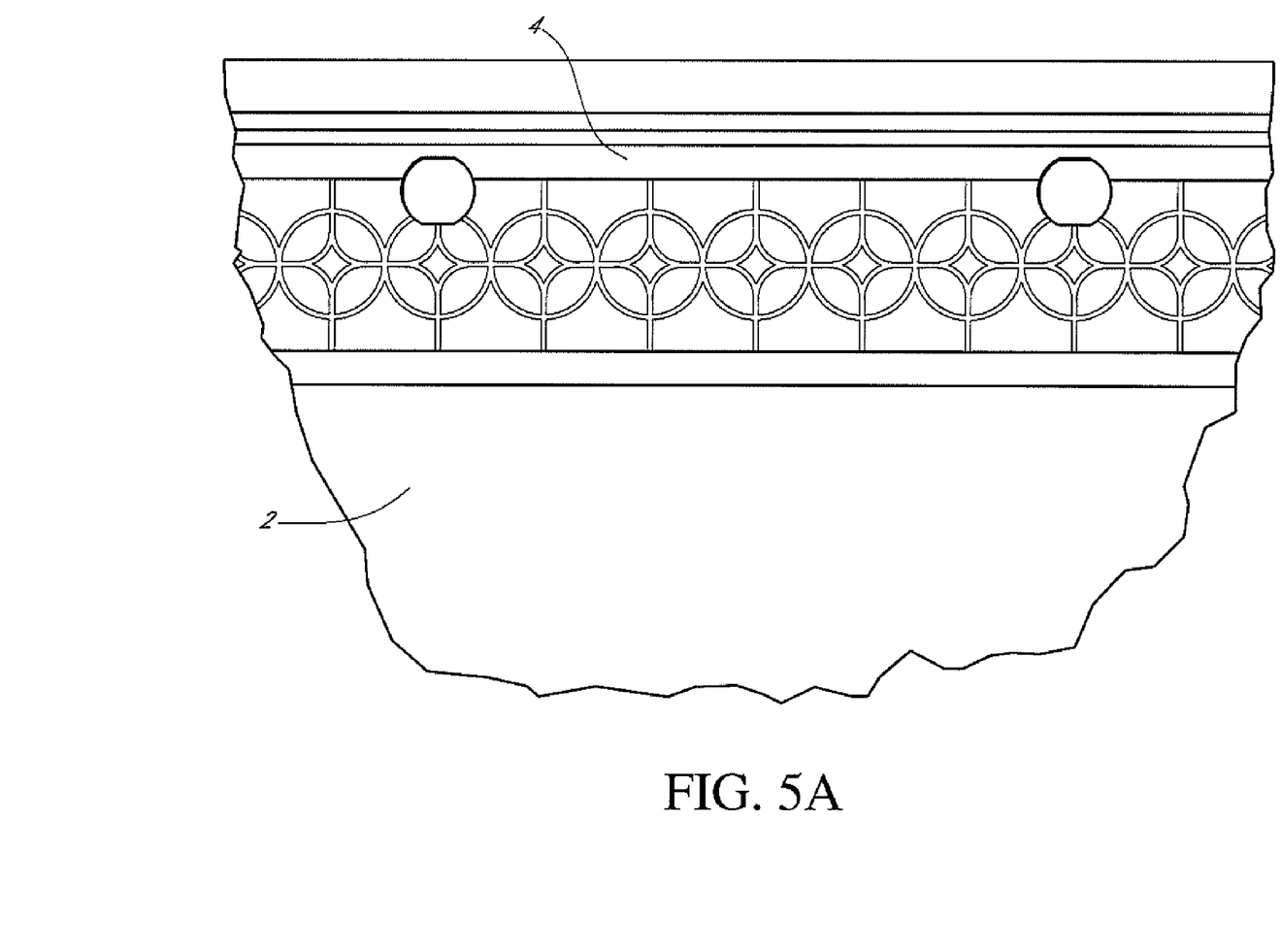
FIG. 5A illustrates a sidewall of a pool illustrating the locking nature of the pool wall hole having a plurality of non-curved sides.
Figure 5B:
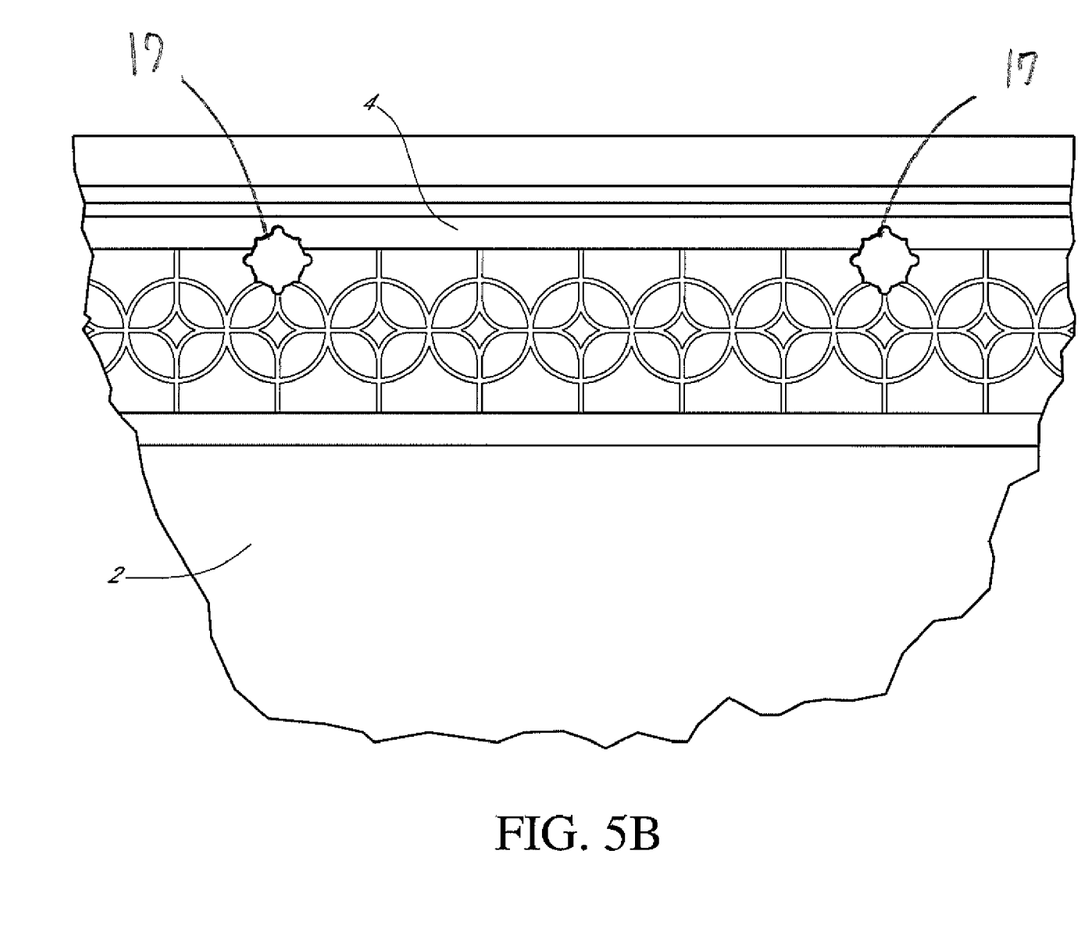
FIG. 5B illustrates another embodiment of a sidewall of a pool illustrating the locking nature of the pool wall hole having a plurality of non-curved sides.
Figure 6:
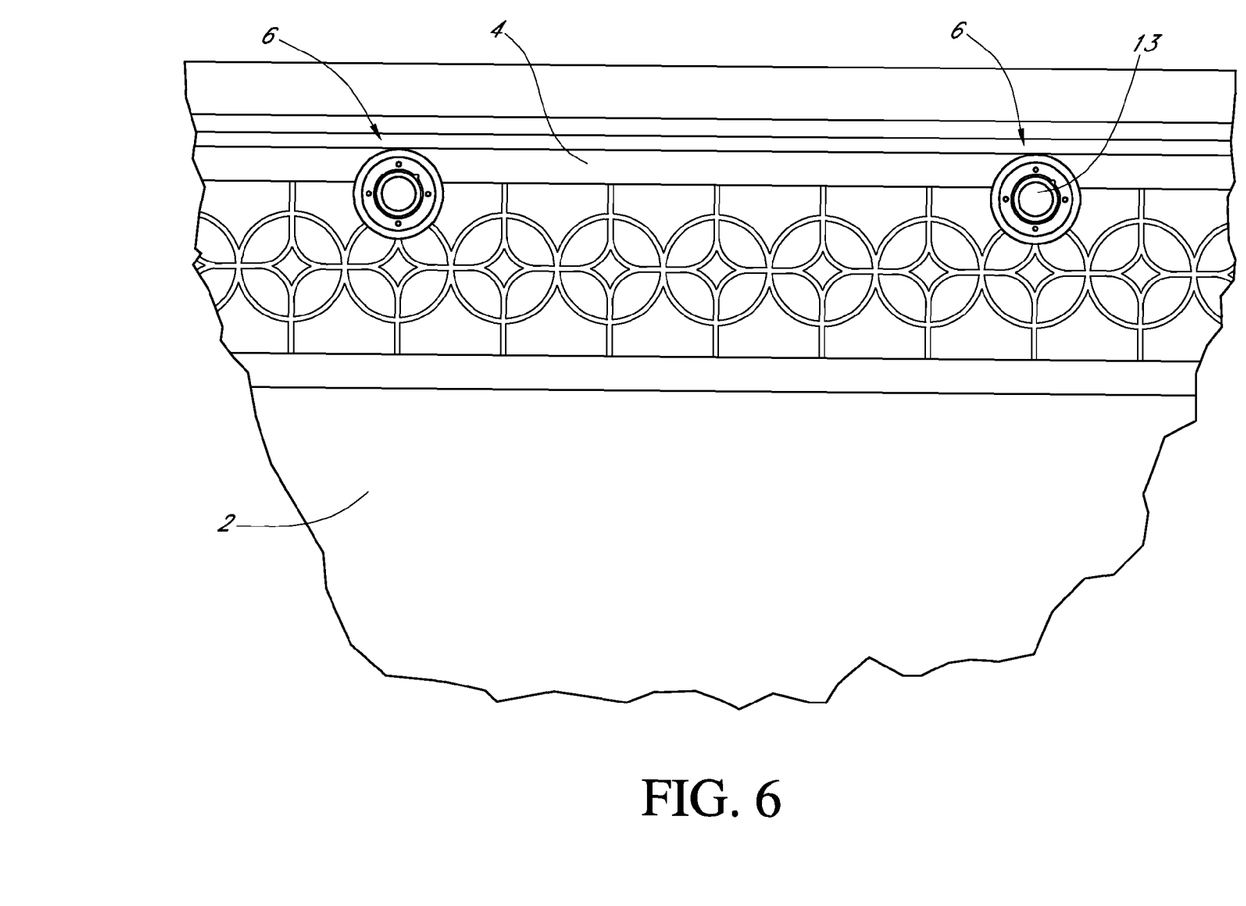
FIG. 6 illustrates a sidewall of a pool adaptable for use with the universal mounting coupling.

As illustrated, a universal mounting coupling 6 comprising a first portion 40 is to be mounted to the exterior portion of a rigid pool wall 1 having a hole 17 therein. The first portion 40 of the universal mounting coupler 6 further comprises a first fitting 41 having a first and second end. The first end and the second end are connected by an internal passage 42 therein. The first end of the first fitting 41 is adapted for connection with a fluid line or pipe 19 for fluid communication. As illustrated herein, this is typically hydraulic fluid to drive the propulsion unit, however, as those of ordinary skill will appreciate, the present disclosure is not so limited. The first portion 40 also includes a first bushing 43, said first bushing 43 having a first and second end, said first end of said first bushing 43 affixed to said second end of said first fitting 41, said first bushing 43 also having an internal passage 44 therein. The universal mounting coupler is also includes a second portion 45 to be inserted through and supported by said hole 17 positioned within said rigid pool wall 1 which further comprises a barrel 46, said barrel 46 having a first end and a second end connected by an interior passage 47, said first bushing 43 affixed at said first end of said barrel interior passage 47, said barrel 46 also having an exterior sized to fit within said hole 17 positioned within said pool wall 1. An exterior locking portion 49 having a first end and a second end, said first end of said exterior locking portion 49 adapted to cooperably engage with said exterior portion of said first end of said barrel 48 and encompass said first end of said barrel 46. An internal retainer portion 50, said internal retainer portion 50 positioned near said first end of said barrel 46, said internal retainer portion 50 having a diameter greater than both said barrel 46 and said hole 17 positioned within said pool wall 1. An outer ring 52 is then positioned for engagement with a sealing element 51 which is positioned between said first end of the barrel 46 and said outer ring 52 to surround the circumference of said interior passage 47 and compress said sealing element 51.

A third portion 55 is symmetrical to the first portion but positioned within the pool. It is to be mounted to the interior portion of the pool wall 1 and further comprises a second fitting 54 having a first and second end, said first end and said second end connected by an internal passage 54 therein, said first end adapted for connection with a fluid line or pipe 19 for fluid communication. A second bushing 57 having a first and second end, said first end affixed to said second end of said first fitting 53, said second bushing 57 also having an internal passage therein and wherein said second bushing 57 is engaged with said second end of said barrel 46. As illustrated in FIGS. 4, 4A and 4B, the first portion 40, second portion 45 and third portion 57 are cooperably engaged to each other to create a sealed passage between the exterior of the pool wall 1 and the interior of the pool wall 1 for fluid communication through said universal mounting coupling 6. FIG. 4 illustrates a universal mounting coupling 6 inserted through pool wall 1.

In other embodiments, the universal mounting coupling 6 may be interference fit, made of pres-cast pieces or may be produced using a combination of pieces wherein said first portion 40, said second portion 45 and said third portion 55 are threadably engaged to each other, as shown.

Typically, the universal mounting coupling 6 is used in combination with a non-rigid liner 2, made of latex, to be adhered to said pool wall 1 may be engaged between said outer ring 52 and said sealing element 51. The universal mounting coupling 6 for engagement with the wall of a pool 1 according to claim 1 wherein said first end of said exterior locking portion 49 has a face and wherein said universal mounting coupling securely engages said pool wall 1 between said face of said exterior locking portion 58 and said internal retainer portion 50.

The universal mounting coupling 6 for engagement with the wall of a pool 1 according to claim 1 wherein said first fitting 41 and said second fitting 53 are adapted for engagement with a pair of caps (38, 39) for engagement with a hydraulic hose 19.

The universal mounting coupling 6 according to claim 1 wherein said second portion 45 has a generally cylindrical shape. The universal mounting coupling according to claim 1 wherein said barrel 46 of said second portion 45 has a generally cylindrical shape. The universal mounting coupling according to claim 7 wherein said barrel 46 of said second portion 45 has a generally cylindrical shape and at least one side that is non-curved 59.

The universal mounting coupling according to claim 8 wherein said hole in said pool wall 17 is configured for locking engagement with said at least one non-curved side of said barrel 59 of said second portion 45.

The universal mounting coupling 6 according to claim 1 wherein said first end of said barrel has radiused face 60 to center said sealing element on said first end of said barrel 46.

The universal mounting coupling 6 according to claim 1 wherein said first 40, said second 45 and said third portions 55 are created from corrosion resistance materials including stainless steel, bronze, aluminum, polyvinyl chloride (PVC), plastic and or combinations therein.

A universal mounting coupling 6 according to claim 1, 2, 3 or 9 wherein a water propulsion unit 32 may be mounted upon said universal mounting coupling within a pool to produce a current.

As shown, face ring 7 is mounted to pool wall 1 by screws 8 around the perimeter of face ring 7 into isolator 9. FIGS. 4A and 4B provide detailed views of the universal mounting coupler 6. As is apparent to those of skill in the art, the universal mounting coupling 6 is to be placed in a hole formed in the pool wall 2 and pool wall substructure 3. The face ring 7 is then mounted to barrel 46 by screws 8 around the perimeter of face ring 7.

The body of the universal mounting coupler 6 is composed of isolator 9 which is typically machined from materials corrosion resistance materials such as stainless steel or bronze. Isolator 9 (Barrel 46) may be mounted with an internal nipple 11 (interior to the pool walls) and an external nipple (exterior to the pool walls) 12. The isolator 9 is configured to provide a secure path into and out of the pool wall of hydraulic fluid necessary to drive the propulsion system while allowing the removable propulsion system 32 to be mounted upon said universal mounting coupler 6. The exterior of the isolator 9 is configured with grooves that allow for an interlocking or interference fit with o-rings 10 to seal-off water ingress between the face ring and the isolator 9 or the locking nut 14 and isolator 9. The internal nipple 11 may be threaded to allow its removal from the isolator 9 at isolator opening 13. Upon removal, a non-obtrusive plug may be placed in the isolator opening to minimize ingress of water while providing support for the placement of the latex surface 2 over the interior portion of the universal mounting coupler so as to "hide-it" until needed by the pool user, as illustrated in FIG. 10. The isolator 9 allows connection to a nipple (Exterior) 12 for coupling to the externally located power unit 22. Locking nut 14 secures the position of the universal mounting coupler to the backside of the pool wall 1 and within the pool wall substructure 3.

It is the intention of the inventor that one of the ways in which the invention may be implemented is by forming or pre-forming holes in the steel walls 1 used for pools during manufacturing. If the customer should decide later that they have need or desire for an exercise pool or swim treadmill, the latex surface 2 of the pool wall 1 may be peeled back to reveal a pre-formed or perforated hole adaptable for inclusion of a universal mounting coupler 6. Another way would be to sell the customer a kit which allows replacement of one section of pool wall 1 with a section pre-configured for use with the universal mounting coupler 6 disclosed herein. In another embodiment, the universal mounting coupler 6 may be placed in the pool wall at the factory and both the interior and exterior nipples replaced with plugs until such time as the universal coupler is configured with nipples to allow for coupling with a hydraulic system and fluid transmission to drive a propulsion system 32. (See FIG. 7)

Figure 8:
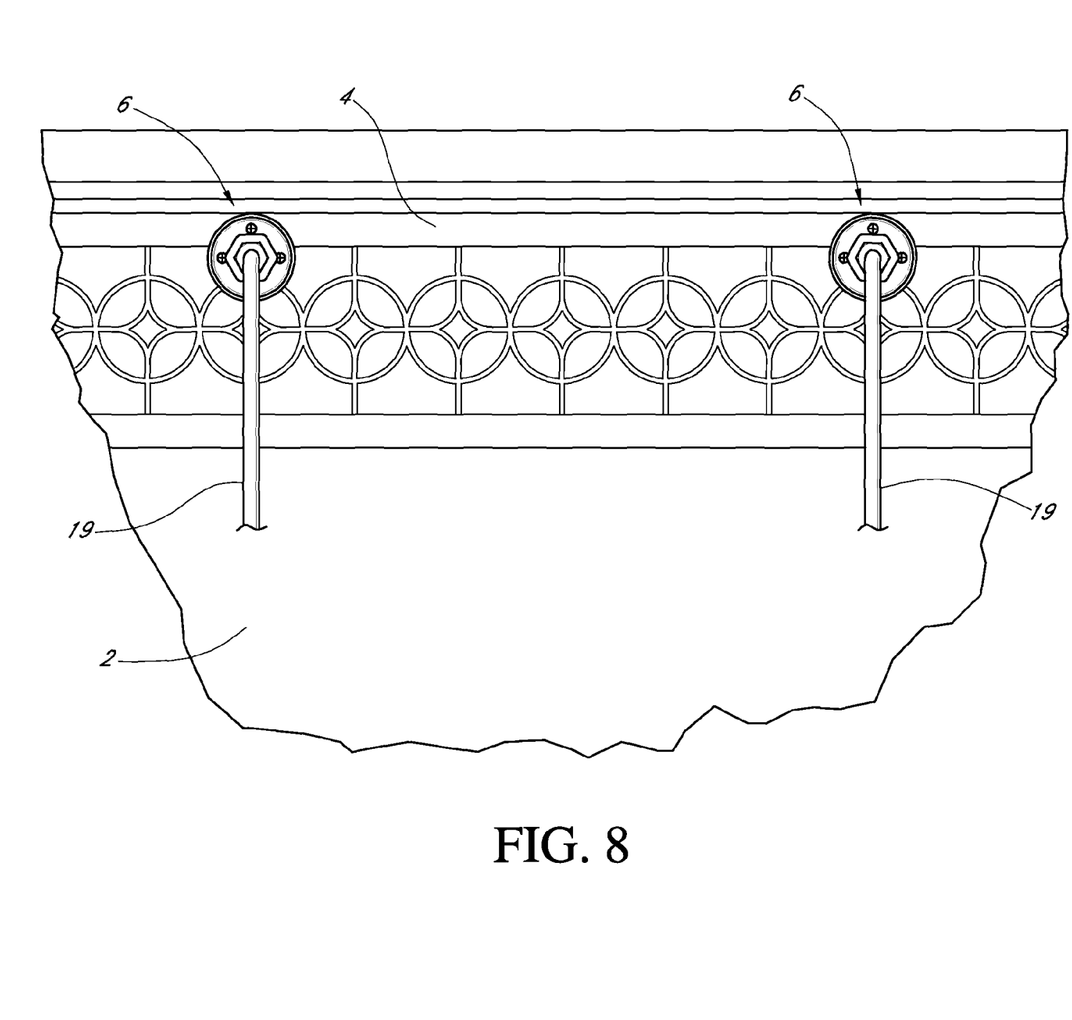
FIG. 8 illustrates a pair of universal mounting couplings connected to a pair of hydraulic hoses.
Figure 8A:
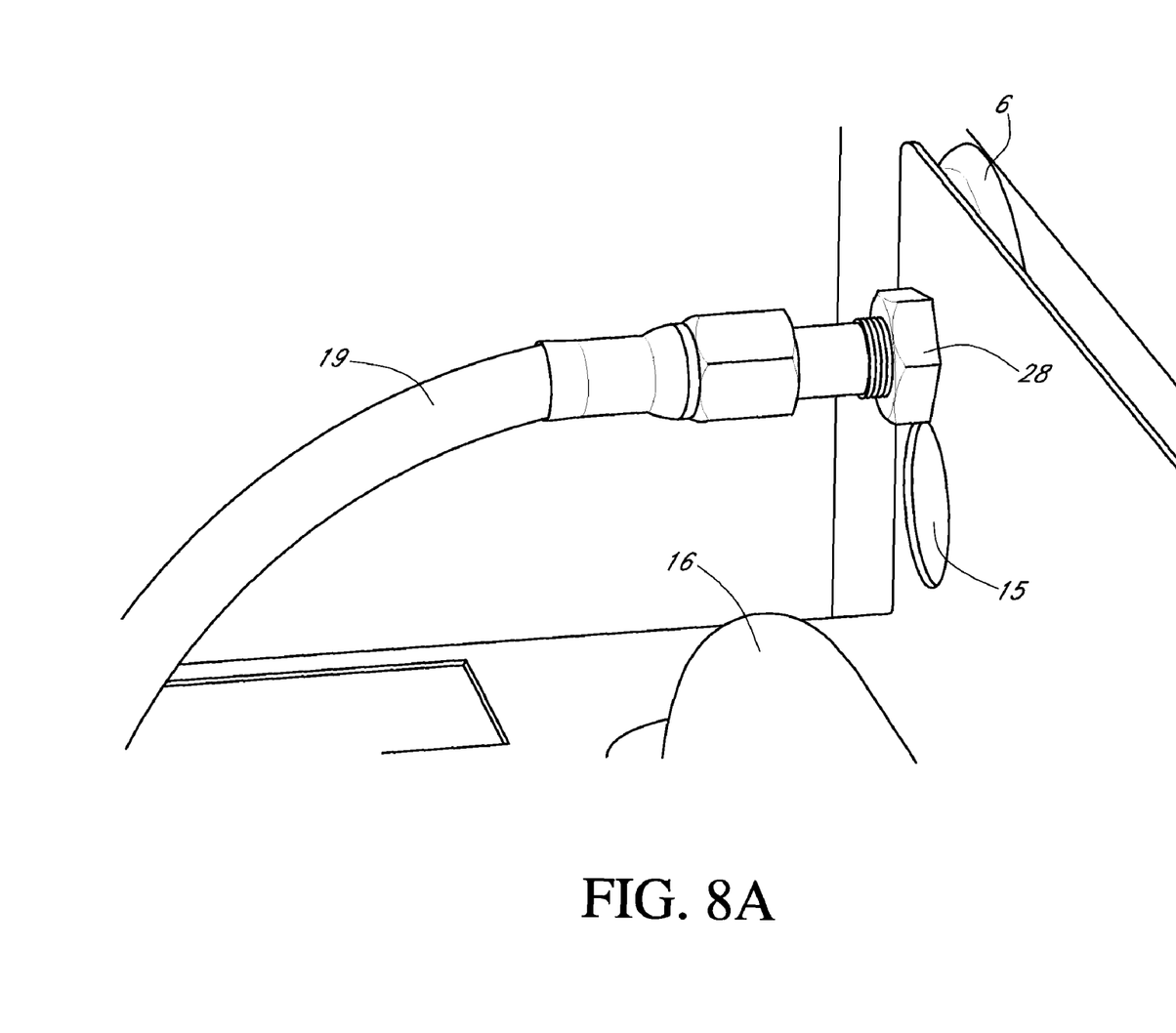
FIG. 8A illustrates the universal mounting coupler attached to the propulsion drive system.

FIG. 10 illustrates a sidewall of a pool 1 adaptable for use with the universal mounting coupling 6. FIG. 8 illustrates a pair of universal mounting couplings with propulsion drive hoses attached. FIG. 8A illustrates the universal mounting coupler attached to the propulsion drive system 32.

Figure 7:
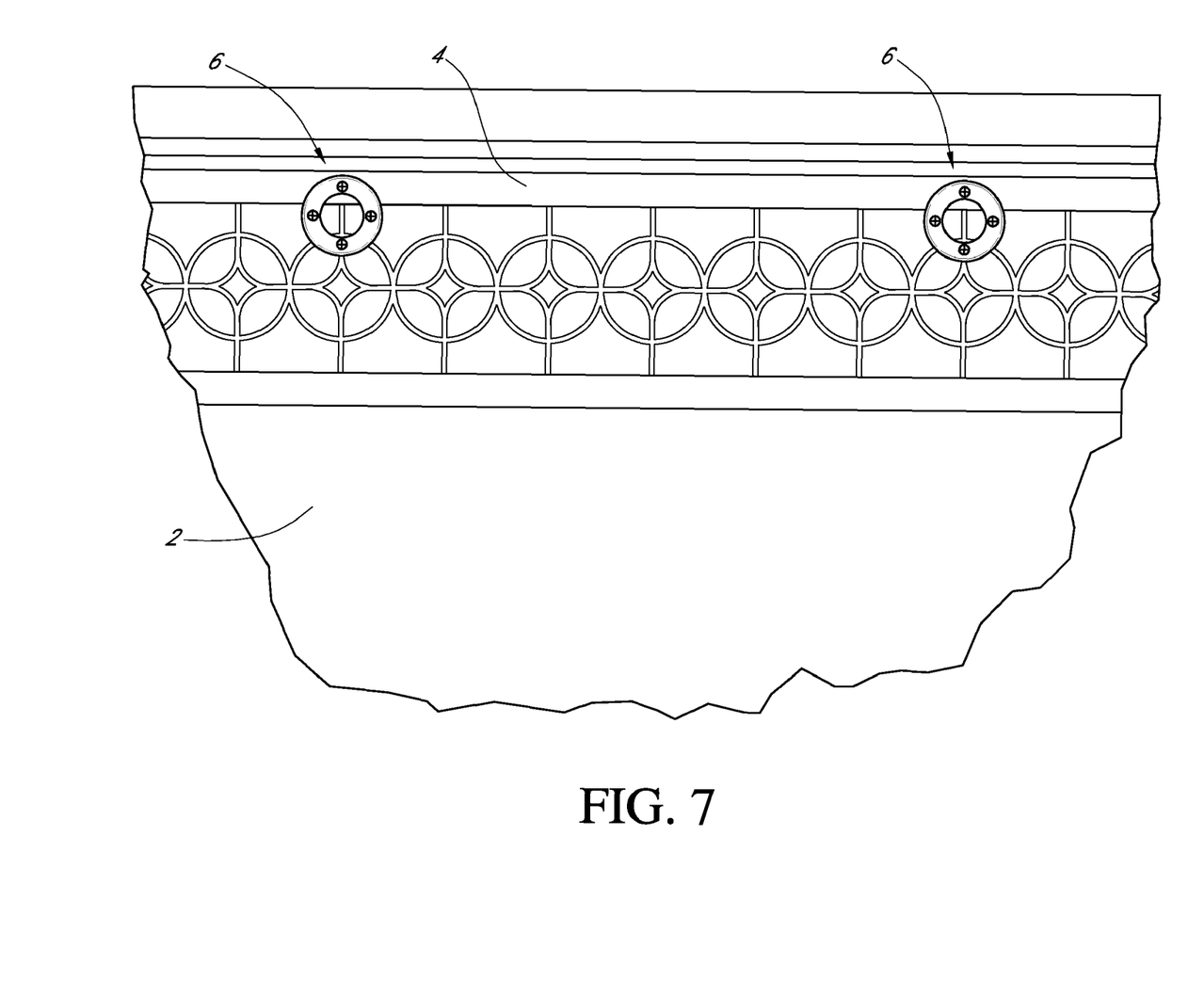
FIG. 7 illustrates a pair of universal mounting couplings with the latex "hiding" the coupling until needed.
Figure 9:
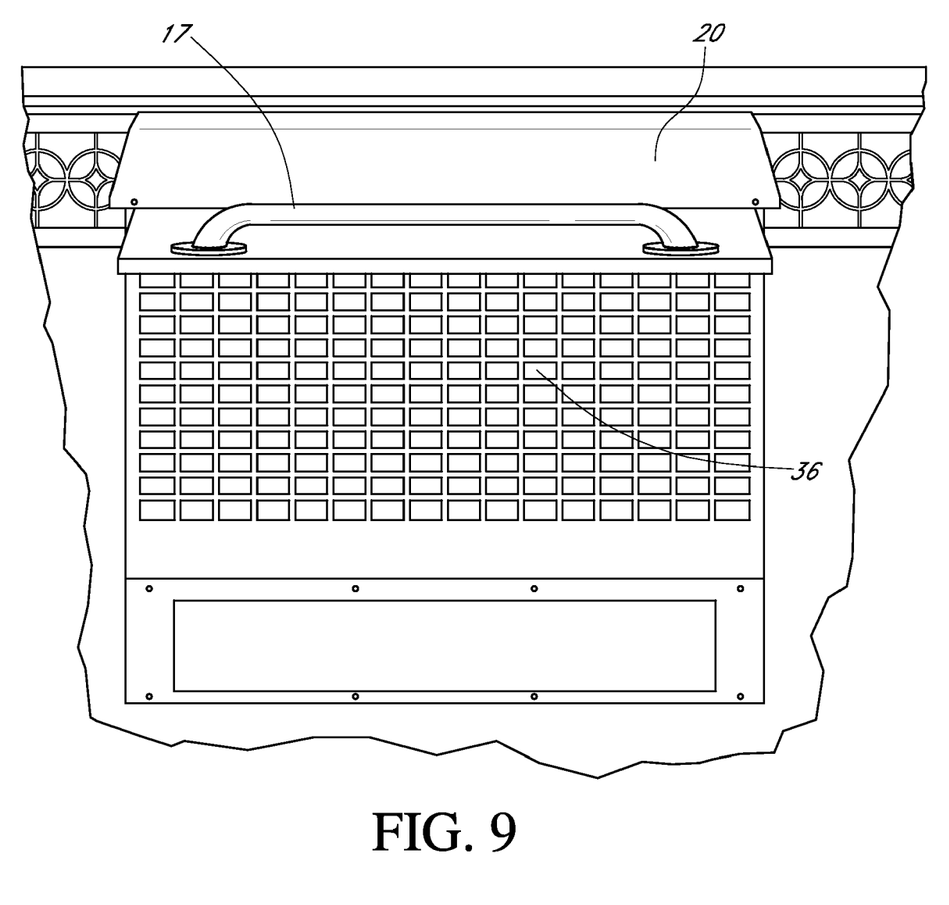
FIG. 9 illustrates the stainless steel propulsion system of FIG. 8A mounted within the pool with the decorative covers in place to conceal the universal mounting couplings and support structure.

FIG. 9 illustrates the propulsion system 32 of FIG. 7 mounted within the pool with the decorative covers (20, 21) in place to conceal the universal mounting couplings 6 and support structure (14, 15). The propulsion system 32 has a housing 33 which surrounds a propeller (not shown) which is driven by the externally positioned power unit 22 having an external pump 23 driven by external motor 24. Typically, external motor 24 is electrically connected at a location that is safely away from the pool. FIG. 13 illustrates an embodiment of the self-contained external hydraulic system used to drive the propulsion system 32.

The propulsion system housing 33 is configured to have an intake 35 for the induction of water from the swimming pool into the propeller and a discharge 36 for the directed delivery of the water back into the pool after force has been imparted into the inducted water by the hydraulically driven propeller. As configured, the propulsion housing 33 has a back plate 34 which sufficiently reinforced to support the full weight of the propulsion system 32 which can be between 200 and 700 pounds, depending on the amount of water within the propulsion system 32. In the embodiment shown herein, the propulsion system 32 is positioned upon a pair of universal mounting couplers 6. The back plate 34 has a pair of engagement notches 15 spaced apart the same distance as the universal mounting couplers 2 set in the pool wall 2. The engagement notches 15 have a keyhole shape to "lock" them onto the universal mounting coupler 6. External locking nut 28 may then be threaded onto universal mounting coupler 6 to limit axial movement. As illustrated, the wheels 37 enhance the ease of moving or removing the propulsion system 32. FIG.

11A also illustrates how compact and un-intrusive the propulsion system attachment design is. As shown in FIG. 11A, but hidden in FIG. 12, the relationship and orientation between the universal mounting coupler and the propulsion system housing 33 allows the hydraulic hoses 18 to be hidden by the side mounting covers 21 while the universal mounting couplers 6, frame handle 16 and back plate 34 are hidden by the top mounting cover 20.

It should be noted that the present invention is not limited to the specific embodiments pictured and described herein, but is intended to apply to all similar apparatuses for allowing a pool to be used as an exercise pool and swim treadmill. Modifications and alterations from the described embodiments will occur to those skilled in the art without departure from the spirit and scope of the present invention. Furthermore, any type of pool structure may be used with the swim treadmill water pump in any manner without limiting the scope of the universal swim treadmill and structure.

The invention claimed is:

1. A pool wall universal mounting coupling (6) comprising:
   a. a first portion (40) to be mounted to the exterior of a rigid pool wall (1) having a hole (17) therein and comprising:
      1. a first fitting (41) having a first and second end, said first end and said second end connected by an internal passage (42), said first end adapted for connection with a fluid line or pipe (19) for fluid communication;
      2. a first bushing (43), said first bushing (43) having a first and second end, said first end affixed to said second end of said first fitting (41), said first bushing (43) also having an internal passage (44) therein;
   b. a second portion (45) to be inserted through and supported by said hole (17) positioned within said rigid pool wall (1) and comprising:
      1. a barrel (46), said barrel (46) having a first end and a second end connected by an interior passage (47), said first bushing (43) affixed at said first end of said barrel interior passage (47), said barrel first end also having an exterior portion sized to fit within said hole (17) positioned within said pool wall (1);
      2. an exterior locking portion (49) having a first end and a second end, said first end of said exterior locking portion (49) adapted to cooperatively engage with said exterior portion of said first end of said barrel (48) and encompass said first end of said barrel (46);
      3. an internal retainer portion (50), said internal retainer portion (50) positioned near said first end of said barrel (46), said internal retainer portion (50) having a diameter greater than both said barrel (46) and said hole (17) positioned within said pool wall (1);
      4. an outer ring (52);
      5. a sealing element (51) positioned between said first end of the barrel (46) and said outer ring (52) to surround the circumference of said interior passage (47) and compress said sealing element (51);
   c. a third portion (55) to be mounted to the interior portion of said pool wall (1) and comprising:
      1. a second fitting (53) having a first and second end, said first end and said second end connected by an internal passage (54) therein, said first end adapted for connection with a fluid line or pipe (19) for fluid communication;
      2. a second bushing (57) having a first and second end, said first end affixed to said second end of said second fitting (53), said second bushing (57) also having an internal passage therein and wherein said second bushing (57) is engaged with said second end of said barrel (46); and,
   d. wherein said first portion (40), said second portion (45) and said third portion (57) are cooperatively engaged to each other to create a sealed passage between said exterior of said pool wall (1) and said interior of said pool wall (1) for fluid communication through said universal mounting coupling (6);

wherein said first portion (40), said second portion (45) and said third portion (55) are threadably engaged to each other; wherein said first end of exterior locking portion (49) has a face (58) and wherein said universal mounting coupling securely engages said pool wall (1) between said face (58) of said exterior locking portion (49) and said internal retainer portion (50); wherein said first fitting (41) and said second fitting (53) are adapted for engagement with a pair of caps (38, 39) for engagement with a hydraulic hose (19).

2. The universal mounting coupling (6) according to claim 1, wherein a non-rigid liner (2) to be adhered to said pool wall (1) may be engaged between said outer ring (52) and said sealing element (51).

3. The universal mounting coupling (6) according to claim 1, wherein said second portion (45) has a generally cylindrical shape.

4. The universal mounting coupling (6) according to claim 1, wherein said barrel (46) of said second portion (45) has a generally cylindrical shape.

5. The universal mounting coupling (6) according to claim 4, wherein said barrel (46) of said second portion (45) has a generally cylindrical shape and at least one side (59) that is non-curved.

6. The universal mounting coupling (6) according to claim 5, wherein said hole in said pool wall (17) is configured for locking engagement with said at least one non-curved side (59) of said barrel of said second portion (45).

7. The universal mounting coupling (6) according to claim 1, wherein said first end of said barrel has radiused face (60) to center said sealing element on said first end of said barrel (46).

8. The universal mounting coupling (6) according to claim 1 wherein said first (40), said second (45) and said third portions (55) are created from corrosion resistant materials selected from the group consisting of stainless steel, bronze, aluminum, polyvinyl chloride (PVC), plastic and combinations thereof.

9. The universal mounting coupling (6) according to claim 1, 2 or 6, wherein a water propulsion unit (32) may be mounted upon said universal mounting coupling within a pool to produce a current.

* * * * *